(12) United States Patent
Savord

(10) Patent No.: US 6,682,487 B1
(45) Date of Patent: Jan. 27, 2004

(54) ULTRASONIC IMAGING ABERRATION CORRECTION USING HARMONIC AND NON-HARMONIC SIGNALS

(75) Inventor: Bernard J. Savord, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 22 days.

(21) Appl. No.: 10/241,291

(22) Filed: Sep. 10, 2002

(51) Int. Cl.⁷ .......................................... A61B 438/446
(52) U.S. Cl. ........................................................ 600/443
(58) Field of Search .................................. 600/443, 447, 600/437, 458; 73/602

(56) References Cited

U.S. PATENT DOCUMENTS

| | | | |
|---|---|---|---|
| 5,570,691 A | | 11/1996 | Wright et al. |
| 5,577,505 A | * | 11/1996 | Brock-Fisher ............... 600/458 |
| 6,023,977 A | | 2/2000 | Langdon et al. |
| 6,042,556 A | * | 3/2000 | Beach et al. ..................... 601/3 |
| 6,131,458 A | | 10/2000 | Langdon et al. |
| 6,206,833 B1 | | 3/2001 | Christopher |
| 6,223,599 B1 | | 5/2001 | Langdon et al. |
| 6,485,423 B2 | * | 11/2002 | Angelsen et al. ............ 600/458 |
| 6,508,764 B1 | * | 1/2003 | Thiele et al. ................ 600/437 |

OTHER PUBLICATIONS

Liu et al., "Correction of Ultrasonic Wavefront Distortion Using Backpropagation and a reference Waveform Method for Time–Shift Compensation," J. Acoust. Soc. Am. 96 (2), Pt. 1, Aug. 1994, pp 649–660.

* cited by examiner

Primary Examiner—Francis J. Jaworski
(74) Attorney, Agent, or Firm—W. Brinton Yorks, Jr.

(57) ABSTRACT

An ultrasonic diagnostic imaging system and method are provided in which aberration corrections are computed by comparing harmonic and non-harmonic images to derive aberration correction estimates. In a preferred embodiment the harmonic image provides a reference image against which aberrations in the non-harmonic image are compared. A preferred acquisition technique is to transmit at a frequency f and receive at a frequency n*f to acquire the harmonic image and to transmit at a frequency n*f and receive at a frequency n*f to acquire the non-harmonic image. In a preferred embodiment the aberration correction estimates are produced by back-propagating the image data to find the aperture correction data for the two images.

21 Claims, 3 Drawing Sheets

ULTRASONIC IMAGING ABERRATION CORRECTION USING HARMONIC AND NON-HARMONIC SIGNALS

This invention relates to ultrasonic diagnostic imaging systems and, in particular, to ultrasonic diagnostic imaging systems with aberration correction based upon harmonic and non-harmonic signal analysis.

The geometric delay calculations used by ultrasonic transducer array beamformers are generally predicated upon the assumption that the speed of sound through the body being imaged is a known constant. However, the reality is that the body generally provides non-homogeneous tissue paths which can cause different phase and amplitude distortions and arrival time fluctuations to the wave fronts across the array transducer aperture. As a result, an exact focus of transmitted and received beams may not always occur. In theory many of these effects can be overcome by adjustment of the delays used to focus the transmitted and received beams. Determining the delay adjustments needed, and doing so adaptively and in real time, have been the subject of investigations for many years. One approach involves cross correlating echoes received by neighboring transducer elements or groups of elements to estimate arrival time differences. Another approach has been to vary focusing delays so as to maximize the brightness of speckle or reflectors in the image field. While many of these efforts have tried to provide compensation for time shifts in the receiving aperture, others have looked to provide time-shift compensation for the transmit aperture. Many of these approaches are iterative in nature, and face the problems of converging to an acceptable result with an infinitely variable and at times moving combination of reflectors and aberrators in the image field. All have faced the challenges of intensive computation and signal processing and the need to know when the appropriate level of compensation has been provided.

U.S. Pat. Nos. 6,023,977, 6,131,458, and 6,223,599 have addressed the problem from the perspective of the analysis of signals of different frequencies, in particular, various combinations of fundamental and harmonic frequency signals. The various embodiments proposed by these patents use fundamental or harmonic or broadband frequencies to compute aberration correction estimates for fundamental or harmonic images. In several embodiments both the fundamental and harmonic bands of the echo signals are used to derive separate aberration correction estimates, which are then averaged together in the hope that one of the estimates is more stable and will dominate the result. Of course if one estimate is correct and the other erroneous, the correction is made less accurate by the averaging process: The algorithms used for aberration estimation in these patents are variations of the cross-correlation technique mentioned above, in which signals from a subarray of four elements are correlated with signals from an adjacent subarray; the signals from a subarray are correlated against a sum of subarray signals; or the signals from a subarray are correlated against a previously stored subarray signal. These algorithms all derive relative phase adjustments rather than adjustments based upon any known or absolute reference. It is desirable to provide an aberration correction technique which is fast, accurate, and provides corrections toward an absolute measure of image quality.

In accordance with the principles of the present invention, aberration corrections are computed by comparing harmonic and non-harmonic images to derive aberration correction estimates. In a preferred embodiment the harmonic image is a reference image against which aberrations in the non-harmonic image are compared. A preferred acquisition technique is to transmit at a frequency f and receive at a frequency $n*f$ to acquire the harmonic image and to transmit at a frequency $n*f$ and receive at a frequency $n*f$ to acquire the non-harmonic image. In a preferred embodiment the aberration correction estimates are produced by back-propagating the image data to find the aperture correction data for the two images. The inventive technique is particularly useful for aberration correction of data from a two dimensional array which is divided into N×M subarrays.

Figure 1:
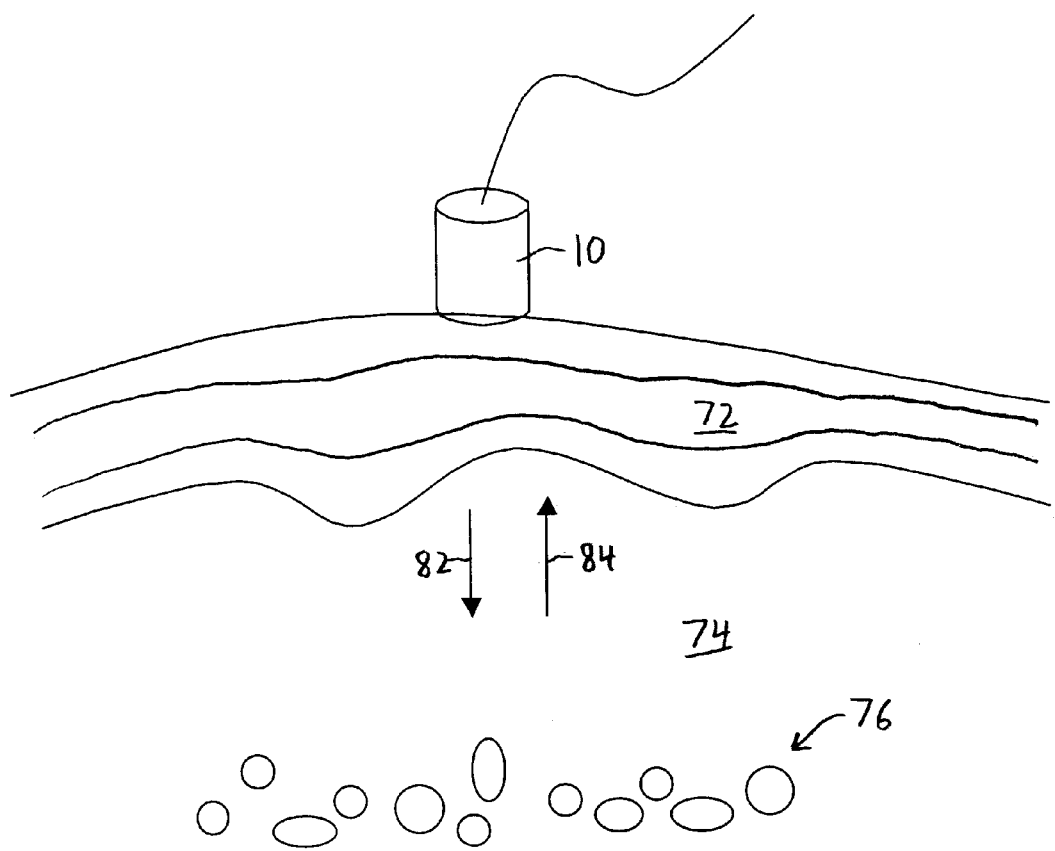
FIG. 1 illustrates an imaging scenario in which the wave fronts encounter aberrators as they travel through the body.

Referring first to FIG. 1, an ultrasound transducer 10 is depicted imaging the body. In this illustration it is desired to produce an image from echo signals returned from sound wave scatterers 76 within the body. These scatterers may be the tissue of an organ to be imaged such as the heart. Ultrasound waves, which may be transmitted (as indicated by arrow 82) and received (as indicated by arrow 84) as steered and focused beams, are transmitted and received by the transducer 10. As the wave fronts travel into the body they initially encounter non-homogeneous tissue 72. This tissue may typically comprise the skin, fat, muscle and ribs which are located beneath the skin, as are often found in the abdomen and chest wall. The wave fronts may travel at a slightly different velocity through this non-homogeneous tissue than the velocity assumed by the geometric focus equations of the ultrasound system. Different wave fronts from an array transducer, which take slightly different paths to the scatterers 76, can arrive at the scatterers at slightly different times rather than simultaneously as intended at the focal point. The non-homogeneous tissues are also encountered by the echo wave fronts on their return to the elements of an array transducer. The aberrators of the non-homogeneous can thus result in less than optimal focusing of the received signals, as the delays computed by the geometric focus equations to bring the signals from the elements of the array into time coherence do not take the time shifts caused by the aberrators into account.

In accordance with the principles of the present invention, aberration correction is done by comparing harmonic and non-harmonic echo signal data. In a preferred embodiment an ultrasound wave is transmitted by the transducer 10 at a frequency f and harmonic echo signals at a frequency $n*f$ are received. In the following example the second harmonic will be used, in which case $n=2$, although other harmonics or subharmonics may be used. As the waves at the fundamental frequency f pass through the non-homogeneous tissue 72 they are affected by the aberrators in the tissue and time-shifted in relation to the aberrators encountered. However, the resulting phase distortion is relatively small by reason of the relatively low frequency f of the transmit waves. The waves then pass through soft tissue 74 on their paths to the scatterers 76 and by doing so the non-linear media of the soft tissue distorts the waves, causing harmonic signal components at the frequency 2f to develop. Harmonic development increases as the pressure wave comes into focus in the region being imaged. Since the majority of harmonic development occurs after passage of the waves through the non-homogeneous media, the harmonic wave components are relatively unaffected by the aberration effects of this tissue. The harmonic signals are reflected by the scatterers 76 and the echoes return to the transducer 10 for reception.

The transducer also transmits and receives fundamental frequency signals. In the preferred embodiment the fundamental frequency signals are transmitted at a frequency of nf and received at the frequency nf. In this example where n=2, the transmitted frequency is 2f. As the waves at this frequency travel through the non-homogeneous media 72, they are affected by the time-shifts caused by the aberrators of the non-homogeneous tissue which cause relatively significant phase shifts at the higher frequency of 2f. The fundamental frequency waves 2f also do not enjoy the benefit of developing after passage through the non-homogeneous tissue as the harmonic signals did. The fundamental frequency signals arrive at the scatterers 76 and are reflected back to and received by the transducer 10.

In the absence of aberration effects the harmonic and non-harmonic received signals, both at a frequency of 2f, should be substantially identical. As discussed below, this will be substantially the case when there is no intervening motion between transmit events and the round trip spectral response of the signals is equalized by considerations such as the relative transmit power or gain compensation applied to the fundamental and harmonic echoes (B/A). But in the presence of aberration the non-harmonic signals should be significantly more degraded with respect to the harmonic signals for the reasons given above. Thus the harmonic signals are used as a baseline or reference against which aberration effects in the non-harmonic signals are compared and aberration corrections made.

In accordance with a further aspect of the present invention, the harmonic and non-harmonic signals are compared by the process of back propagation. The echo data of both types of signals is back-propagated to determine the aperture data for the two signal types and a complex ratio of the aperture data is formed to produce an estimated aberration correction. The aberration correction values are combined with the geometric focus delay values (or the geometric focus delay values as modified by previous aberration correction) to produce aberration corrected beamformer delays.

A mathematical derivation of this aberration correction is as follows. This analysis assumes a narrow band far field (or focal point) approximation to simplify the mathematics. All ultrasound acoustic lines are described in k-space by a unit vector centered at the center of a phased array transducer and pointing along the direction of the acoustic line. The full aperture of the transducer is used to transmit sound waves into the body. Data is gathered at a sequence of transmit angles covering a plane or volume of interest. The transmit pressure at the surface of the array can be described mathematically by:

$$P_T = A(\vec{x}) e^{j2\pi F/C \vec{x} \cdot \vec{k}_0}$$

where $k_0$ is the steering vector, the vector x describes the locations of the transmit elements, and the function A describes any apodization as well as defining the aperture. The phase term describes the steering phase, F is the transmit frequency, and C is the speed of sound.

The non-homogenous chest wall is assumed to have no effect on low frequency propagation, but adds an amplitude and phase error $e^{\alpha(\vec{x}) + j\beta(\vec{x})}$ to the local pressure at high frequencies.

Transmit beam formation occurs in the tissue following the chest wall. As the transmit wave front passes through the body it forms a beam profile given by:

$$B(\vec{k}) = \iint P(\vec{x}) e^{-j2\pi F/C \vec{k} \cdot \vec{x}} \partial \vec{x}$$

where F=frequency, P=local pressure, and C=sound velocity. The non-linear media 74 generates a second harmonic of the pressure proportional to the square of the incident pressure. The scatterers reflect the pressure and weight it by $S(\vec{k})$.

A single transducer receive element is used to interrogate the returning wave. Since a single element has no directionality, it integrates pressure over all k space:

$$R(\vec{k}_0) = \iint P(\vec{k}) \partial \vec{k}$$

This receive data is stored for each transmit steering angle $k_0$ and then "back propagated" to find the equivalent aperture data using a Fourier transform:

$$G(\vec{y}) = \iint R(\vec{k}_0) e^{-j2\pi F/C \vec{k}_0 \cdot \vec{y}} \partial \vec{k}_0$$

where R is receive data for a transmit steering angle given by $k_0$ and vector y is the position in the aperture. The function G(y) is compared for the non-harmonic and harmonic cases with the ratio of the back-propagated harmonic and non-harmonic data providing the aberration estimate. The details of this analysis are shown in Table I. An important consideration to note in the detailed analysis is that the scattering term S(x) does not appear in the final result. This means that the aberration estimates are independent of the scatterer targets being imaged. For practical systems the integrals used to calculate G(y) are replaced by discrete summations.

The preceding analysis is for a full transmit aperture and a single receive element. Other embodiments discussed below utilize a subarray of receive elements.

Figure 2:
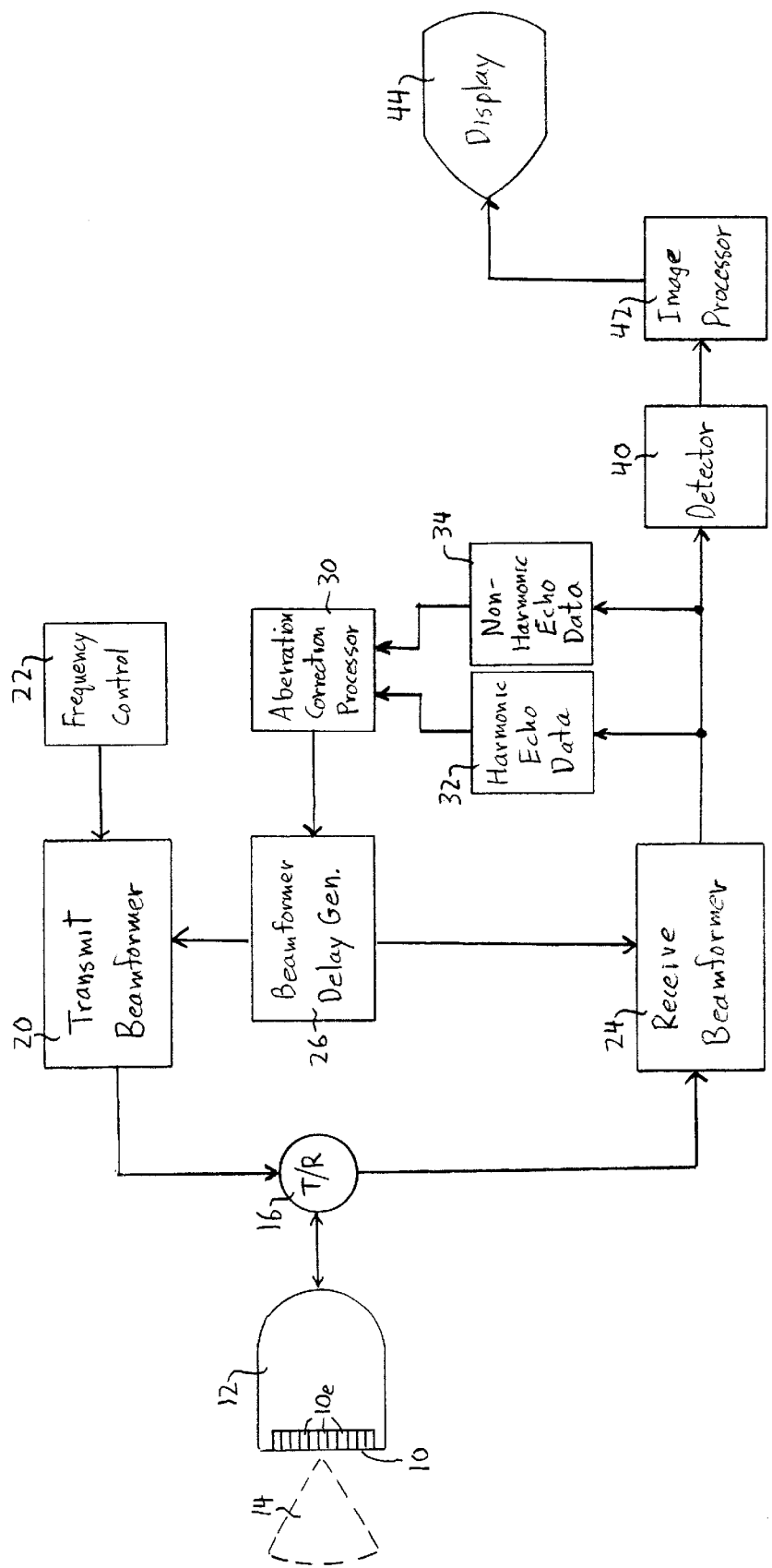
FIG. 2 illustrates an ultrasonic diagnostic imaging system constructed in accordance with the principles of the present invention.

An ultrasonic diagnostic imaging system constructed in accordance with the principles of the present invention is shown in FIG. 2. A probe 12 includes an array transducer 10 composed of elements 10e. The array transducer transmits and receives scanlines over an image field 14. In this embodiment the probe 12 is a phased array probe which scans the image field by steering scanlines at different angles over the image field, although the invention is equally applicable to linear array and other transducer types. The probe 12 is connected to a transmit beamformer 20 and a receive beamformer 24 by a transmit/receive switch 16 which protects the receive beamformer from high energy transmit pulses. Steering and focusing of the beams transmitted by the transmit beamformer is accomplished by transmit delay values provided by a beamformer delay generator 26, which also furnishes receive delay values to the receive beamformer to steer and dynamically focus received beams. The beamformer delay generator may access a library of geometric focus delay tables which are provided to the beamformers for a desired beam angle and focus, or the delay generator may compute delay values for the beams prior to individual transmit-receive sequences. The transmit beamformer is responsive to a frequency control 22 which controls the frequency of the transmit waves, that is, either transmission at a fundamental frequency f or at a higher frequency nf.

The receive beamformer 24 forms coherent scanline data which is coupled to a detector 40. The detector may perform amplitude detection for B mode imaging or spectral detection for Doppler imaging. Detected echo signals are provided to an image processor 42 which processed the scanline signals into the desired image format. The resultant image is displayed on a display 44.

The receive beamformer 24 is also coupled to a harmonic echo data memory 32 and a non-harmonic echo data memory 34. When the receive beamformer is receiving harmonic echo data 2f in response to fundamental frequency f transmission, the harmonic image scanlines are stored in memory 32. When the receive beamformer is receiving fundamental frequency data 2f from fundamental frequency 2f transmission the fundamental image scanlines are stored in memory 34. If aberration correction is only to be performed at a discrete range r in the image field the memory size may be minimized by only gating echo data at the range r to the memories 32 and 34, which may be different storage areas of a single memory device. Aberration correction may be done for a particular image range r where the scatterers to be imaged are located such as the transmit focal range, or for a plurality of different ranges. The harmonic and non-harmonic image data is provided to an aberration correction processor 30 which equalizes the harmonic and non-harmonic data for known systemic differences and compares the non-harmonic data to the harmonic data to estimate aberration correction values. The comparison is done by back propagation and comparison of the harmonic and non-harmonic data sets as more fully described below. The aberration correction values are coupled to the beamformer delay generator 26 where they are combined with the geometric delay values for the production of aberration-reduced ultrasonic images.

Figure 3:
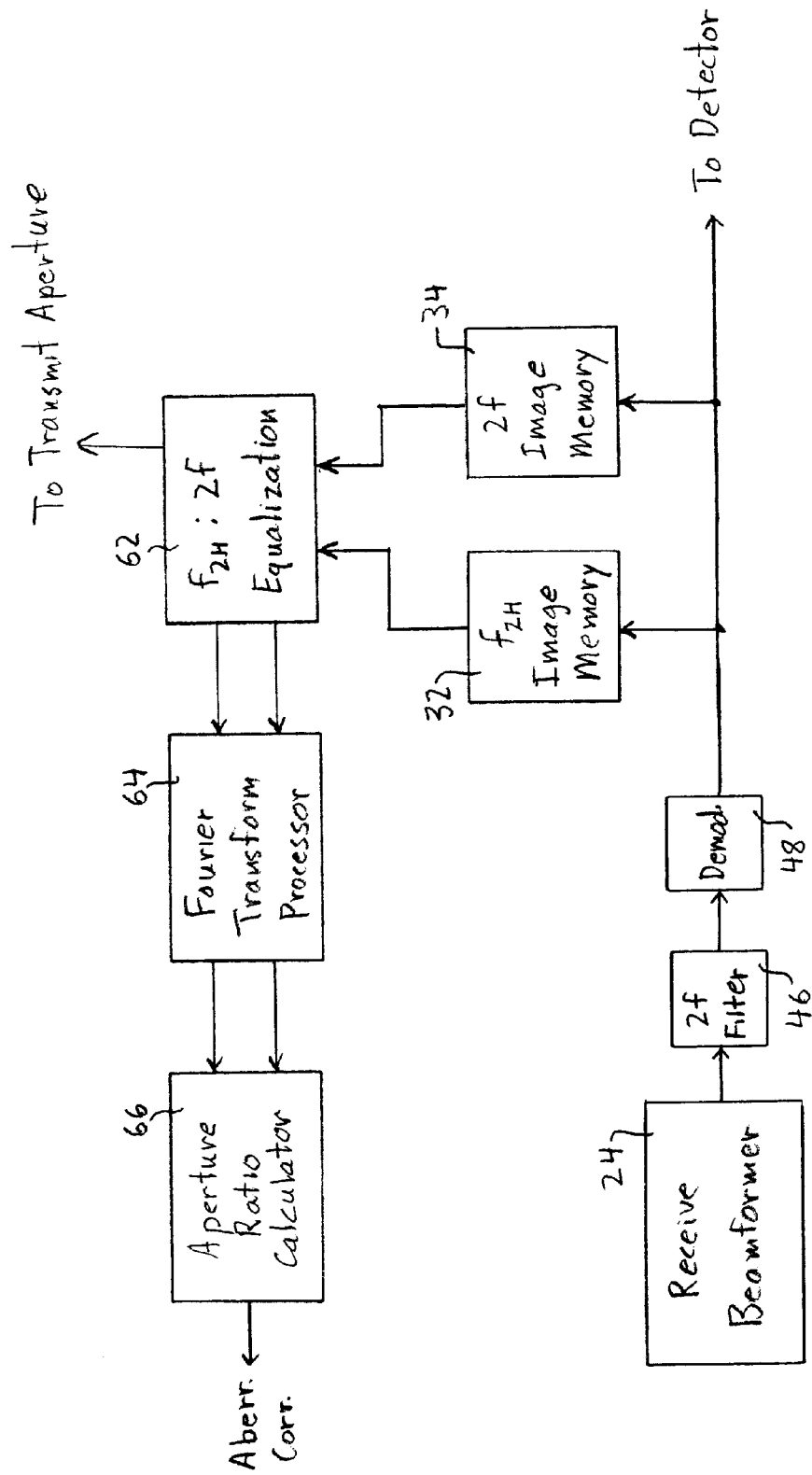
FIG. 3 illustrates details of the aberration correction subsystem of the ultrasonic imaging system of FIG. 2.

FIG. 3 illustrates the aberration correction subsystem of the ultrasound system of FIG. 2 in greater detail. When a broadband array transducer is used for imaging, the receive beamformer, absent any filtering, will produce broadband scanline data. In this example the harmonic used is the second harmonic and it is necessary to extract the harmonic from the broadband signal. This is accomplished by a filter 46 set to pass the harmonic frequency 2f. The filter 46 may also separate harmonic signals from the fundamental signals by pulse inversion processing as described in U.S. Pat. No. 5,951,478. The scanlines of the second harmonic image $f_{2H}$ are stored in memory 32. When the scanlines at the fundamental frequency 2f are received they may be passed by the 2f filter 46 or the filter may be bypassed. The non-harmonic image scanlines are then stored in the 2f memory 34. The high frequency signals from the filter 46 are demodulated by mixing them to a baseband frequency range to reduce the amount of data and hence the bandwidth required for the aberration correction subsystem.

The harmonic and non-harmonic data sets are equalized for systemic differences by an $f_{2H}$:2f equalization processor 62. It is desirable for the two data sets to have the same equivalent aperture and bandwidth, for one example. The round trip spectral response of the two data sets can be adjusted to be identical, for another example. In the latter case more transmit pulses can be used at the higher transmit frequency 2f of the non-harmonic data or compensating receive filter adjustments can be made. In the former case the same aperture width can be used for the two data sets. To make a fundamental image look like a harmonic image triangular aperture weighting is used during fundamental imaging with a 1D array, or pyramidal weighting for the square or rectangular aperture of a 2D array. If transmit apodization is not available, the apodization weighting is applied to the back propagated receive data.

The equalized data sets are back propagated by Fourier transformation of each data set by a Fourier transform processor 64. The purpose of back propagation is to make a comparison of signals in the aperture domain. It is desirable to estimate aberration effects in the aperture domain, as this is the domain in which the corrections can be applied (e.g., gain and/or phase adjustment of each element in the active aperture). The changes in waveform amplitude and shape which were produced by propagation of the aberration time-shifted wave front to the receiving aperture may be removed by the applied corrections. Back propagation is done by using a Fourier transform applied across the image angles, that is, the differently steered scanlines of each data set. The results of the Fourier transform are compared by a phase comparison or an amplitude comparison of the two results as by a division of the non-harmonic and harmonic results by an aperture ratio calculator 66. The comparison can be done by taking a ratio of the baseband signals, using a phase detector, taking a ratio of amplitude-demodulated signals, or a cross-correlation of the two signals. The complex ratio of the back-propagated data sets gives measured aberration correction values for both is gain and phase correction.

While the mathematical analysis given at the outset of this specification was for reception by a single transducer element, a single element is non-selective as to region. The use of a group of receive elements as a subarray enables the use of steered and focused beams and the estimation of different aberration values for different regions of tissue, as well as improved signal-to-noise. This is done by steering a receive subarray to an image region for which aberration data is to be obtained. Transmission is now done over a range of transmit steering angles to fully cover the region within the receive beam profile. The receive steering angle is held fixed. Harmonic and non-harmonic image data is acquired in this manner and stored for processing to generate the aberration correction values for the region. The use of a subarray of elements also fits well with subarray beamforming often used for three dimensional imaging with a 2D array as shown in U.S. Pat. Nos. 5,229,933 and 5,997,479. A separate aberration correction value may be estimated for each group of elements and the size of a group using the same value may be selected to correspond to the aberrator size. The range of steering angles over which the same correction value is used may be selected, as well as the range of elements which use the same correction value. The two are related, as a larger range of steering angles corresponds to a smaller number of transducer elements.

In a 2D array embodiment to provide aberration correction during three dimensional imaging, a 2D array of 48 elements by 60 elements may be divided into an N×M array of 12 groups by 12 groups. This results in each group being a 4 by 5 group of 20 elements. When the subsystem of FIG. 3 is used for aberration correction, 12×12 or 144 2D Fourier transforms are calculated for each data set. The Fourier transforms can be done over 20 steering angles, 4 in elevation and 5 in azimuth.

While it is possible to do the transmission and reception of both harmonic and non-harmonic data sets at the beginning of every image frame, if neither data set is used for the image frame the frame rate will be reduced to a third of the frame rate without compensation. To avoid this frame rate reduction the imaged data set can be used for one of the aberration correction data sets. The acquisition of the data sets can be done on a periodic basis such as once every ten image frames. The acquisition and correction can be done on a time-interleaved basis, where the acquisition and correction of only one or a few subarrays or for one or a few ranges can be performed between image frames. Over the course of a number of image frames the entire array and image field will be corrected and then updated.

TABLE I

| Location | Pressure at specified location for transmitting at F and receiving at 2F | Pressure at specified location for transmitting at 2F and receiving at 2F |
|---|---|---|
| At transducer surface | $A(\vec{x})e^{j2\pi\frac{F}{C}\vec{x}\cdot\vec{k}_0}$ | $A(\vec{x})e^{j2\pi\frac{2F}{C}\vec{x}\cdot\vec{k}_0}$ |
| After non-homogenous media | $A(\vec{x})e^{j2\pi\frac{F}{C}\vec{x}\cdot\vec{k}_0}$ | $A(\vec{x})e^{j2\pi\frac{2F}{C}\vec{x}\cdot\vec{k}_0+\alpha(\vec{x})+j\beta(\vec{x})}$ |
| After transmit beam formation | $\iint A(\vec{x})e^{j2\pi\frac{F}{C}(\vec{k}_0-\vec{k})\cdot\vec{x}}\partial\vec{x}$ | $\iint A(\vec{x})e^{j2\pi\frac{2F}{C}(\vec{k}_0-\vec{k})\cdot\vec{x}+\alpha(\vec{x})+j\beta(\vec{x})}\partial\vec{x}$ |
| After non-linear media | $\left[\iint A(\vec{x})e^{j2\pi\frac{F}{C}(\vec{k}_0-\vec{k})\cdot\vec{x}}\partial\vec{x}\right]^2$ | $\iint A(\vec{x})e^{j2\pi\frac{2F}{C}(\vec{k}_0-\vec{k})\cdot\vec{x}+\alpha(\vec{x})+j\beta(\vec{x})}\partial\vec{x}$ |
| | $= \iiiint A(\vec{x})A(\vec{y})e^{j2\pi\frac{F}{C}(\vec{k}_0-\vec{k})\cdot(\vec{x}+\vec{y})}\partial\vec{x}\partial\vec{y}$ | |
| | $\propto \iint\left[\iint A(\vec{y})A(\vec{x}-\vec{y})\partial\vec{y}\right]e^{j2\pi\frac{F}{C}(\vec{k}_0-\vec{k})\cdot\vec{x}}\partial\vec{x}$ | |
| | $\propto \iint\left[\iint A(2\vec{y})A(2\vec{x}-\vec{y})\partial\vec{y}\right]e^{j2\pi\frac{2F}{C}(\vec{k}_0-\vec{k})\cdot\vec{x}}\partial\vec{x}$ | |
| | $\propto \iint A'(\vec{x})e^{j2\pi\frac{2F}{C}(\vec{k}_0-\vec{k})\cdot\vec{x}}\partial\vec{x}$ | |
| | $A'(\vec{x}) = \iint A(2\vec{y})A(2\vec{x}-2\vec{y})\partial\vec{y}$ | |
| Reflected pressure from scatterers | $\iint S(\vec{k})A'(\vec{x})e^{j2\pi\frac{2F}{C}(\vec{k}_0-\vec{k})\cdot\vec{x}}\partial\vec{x}$ | $\iint S(\vec{k})A(\vec{x})e^{j2\pi\frac{2F}{C}(\vec{k}_0-\vec{k})\cdot\vec{x}+\alpha(\vec{x})+j\beta(\vec{x})}\partial\vec{x}$ |
| At single receive element | $\iiiint S(\vec{k})A'(\vec{x})e^{j2\pi\frac{2F}{C}(\vec{k}_0-\vec{k})\cdot\vec{x}}\partial\vec{x}\partial\vec{k}$ | $\iiiint S(\vec{k})A'(\vec{x})e^{j2\pi\frac{2F}{C}(\vec{k}_0-\vec{k})\cdot\vec{x}+\alpha(\vec{x})+j\beta(\vec{x})}\partial\vec{x}\partial\vec{k}$ |
| | $= \iint S(\vec{x})A'(\vec{x})e^{j2\pi\frac{2F}{C}\vec{k}_0\cdot\vec{x}}\partial\vec{x}$ | $= \iint S(\vec{x})A(\vec{x})e^{j2\pi\frac{2F}{C}\vec{k}_0\cdot\vec{x}+\alpha(\vec{x})+j\beta(\vec{x})}\partial\vec{x}$ |
| | where $S(\vec{x}) = \iint S(\vec{k})e^{j2\pi\frac{2F}{C}\vec{k}\cdot\vec{x}}\partial\vec{k}$ | where $S(\vec{x}) = \iint S(\vec{k})e^{j2\pi\frac{2F}{C}\vec{k}\cdot\vec{x}}\partial\vec{k}$ |
| Back Propagated data | $G(\vec{y}) = \iiiint S(\vec{x})A'(\vec{x})e^{j2\pi\frac{2F}{C}\vec{k}_0\cdot(\vec{x}-\vec{y})}\partial\vec{x}\partial\vec{k}_0$ | $G(\vec{y}) = \iiiint S(\vec{x})A(\vec{x})e^{j2\pi\frac{2F}{C}\vec{k}_0\cdot(\vec{x}-\vec{y})+\alpha(\vec{x})+j\beta(\vec{x})}\partial\vec{x}\partial\vec{k}_0$ |
| | $G(\vec{y}) = S(\vec{y})A'(\vec{y})$ | $G(\vec{y}) = S(\vec{y})A(\vec{y})e^{\alpha(\vec{y})+j\beta(\vec{y})}$ |
| Dividing column 1 into column 2 gives: | Ratio $= \dfrac{A(\vec{y})}{A'(\vec{y})}e^{\alpha(\vec{y})+j\beta(\vec{y})}$ | |

What is claimed is:

1. A method for providing aberration correction values for an ultrasonic transducer array beamformer comprising:

acquiring harmonic echo data from an ultrasonic image field which may contain aberrators;

acquiring non-harmonic echo data from the ultrasonic image field;

comparing the non-harmonic echo data to the harmonic echo data to estimate aberration correction values; and applying the aberration correction values to the beamformer.

2. The method of claim 1, wherein comparing further comprises using the harmonic echo data as a low-aberration reference.

3. The method of claim 2, wherein acquiring harmonic echo data comprises acquiring harmonic echo data having a given frequency; and wherein acquiring non-harmonic echo data comprises acquiring non-harmonic echo data having the given frequency.

4. The method of claim 3, wherein acquiring harmonic echo data comprises acquiring the second harmonic of a fundamental transmit frequency.

5. The method of claim 1, wherein comparing further comprises performing a cross-correlation of harmonic and non-harmonic echo data.

6. The method of claim 1, wherein comparing further comprises back propagating the harmonic and non-harmonic echo data.

7. The method of claim 6, wherein comparing further comprises forming a complex ratio of the back-propagated harmonic and non-harmonic echo data.

8. The method of claim 1, wherein comparing further comprises equalizing the harmonic and non-harmonic echo data for a systemic difference.

9. The method of claim 8, wherein equalizing comprises applying at least one of a triangular and pyramidal apodization during acquisition of the non-harmonic data set.

10. The method of claim 1, further comprising demodulating the harmonic and non-harmonic echo data prior to comparing.

11. An ultrasonic diagnostic imaging system which is corrected for speed of sound aberration comprising:

an array transducer which transmits and receives ultrasonic waves;

a transmit beamformer coupled to the array transducer and capable of causing the transducer to transmit ultrasonic waves at a plurality of selectable frequencies;

a receive beamformer coupled to the array transducer;

a beamformer delay generator coupled to at least one of the transmit beamformer and the receive beamformer which acts to provide geometrically derived delays to a beamformer;

a data storage device coupled to the receive beamformer which acts to store a harmonic data set and a non-harmonic data set; and an aberration correction processor, responsive to the harmonic and non-harmonic data sets and having an output coupled to the beamformer delay generator, which acts to provide the beamformer delay generator with aberration correction values formed by a comparison of harmonic and non-harmonic data.

12. The ultrasonic diagnostic imaging system of claim 11, wherein the aberration correction processor utilizes the non-harmonic data as a reference exhibiting relatively low aberration effects.

13. The ultrasonic diagnostic imaging system of claim 12, wherein the transmit beamformer exhibits a first mode of operation for the transmission of ultrasonic waves at a frequency f and reception of harmonic ultrasonic waves at a frequency nf and a second mode of operation for the transmission of ultrasonic wave at a frequency nf and reception of non-harmonic ultrasonic waves at a frequency nf.

14. The ultrasonic diagnostic imaging system of claim 13, wherein the harmonic ultrasonic waves at the frequency nf are second harmonic frequency waves of the fundamental frequency f.

15. The ultrasonic diagnostic imaging system of claim 13, further comprising a filter coupled to the output of the receive beamformer which passes ultrasonic echo data at a frequency of nf.

16. The ultrasonic diagnostic imaging system of claim 11, wherein the aberration correction processor further comprises a cross-correlation processor.

17. The ultrasonic diagnostic imaging system of claim 11, wherein the aberration correction processor further comprises a back propagation processor.

18. The ultrasonic diagnostic imaging system of claim 17, wherein the back propagation processor further comprises a Fourier transform processor.

19. The ultrasonic diagnostic imaging system of claim 18, wherein the Fourier transform processor is operable to back propagate the harmonic and non-harmonic data sets to a range which is substantially equal to the focal range of the data sets.

20. The ultrasonic diagnostic imaging system of claim 11, wherein the aberration correction processor further comprises a harmonic:non-harmonic data equalization processor.

21. The ultrasonic diagnostic imaging system of claim 1, further comprising a demodulator coupled between the receive beamformer and the output of the aberration correction processor.

* * * * *